United States Patent [19]
Branco et al.

[11] 3,800,212
[45] Mar. 26, 1974

[54] MECHANICAL-TO-ELECTRICAL CONVERSION SYSTEM

[75] Inventors: Richard P. Branco, Collegeville; Clifford J. Bader, West Chester, both of Pa.

[73] Assignee: Burroughs Corporation, Detriot, Mich.

[22] Filed: Feb. 26, 1973

[21] Appl. No.: 335,785

[52] U.S. Cl. ............... 322/28, 290/1 E, 322/40
[51] Int. Cl. ............................................. H02p 9/04
[58] Field of Search ......... 290/1 E; 322/14, 15, 28, 322/38, 40

[56] References Cited
UNITED STATES PATENTS
3,675,113  7/1972  Bader et al. ..................... 322/28

Primary Examiner—James D. Trammell
Attorney, Agent, or Firm—Francis A. Varallo; Edward J. Feeney, Jr.; Edward G. Fiorito

[57] ABSTRACT

The present disclosure describes an electro-mechanical energy conversion system which may be utilized as a long shelf-life energy source for the operation of micropower electronic devices. High conversion efficiency is achieved through the use of a load demand actuated energy metering system and capacitive storage means. An operative embodiment of the system employs electronic means for continuously sensing the level of electrical energy present in the storage means and for releasing a spring-driven miniature alternator to permit it to rotate when the level falls to a predetermined lower voltage limit. Mechanical means are employed to allow the alternator to rotate through a fixed angle and to terminate the powered rotation when this angle has been reached.

11 Claims, 9 Drawing Figures

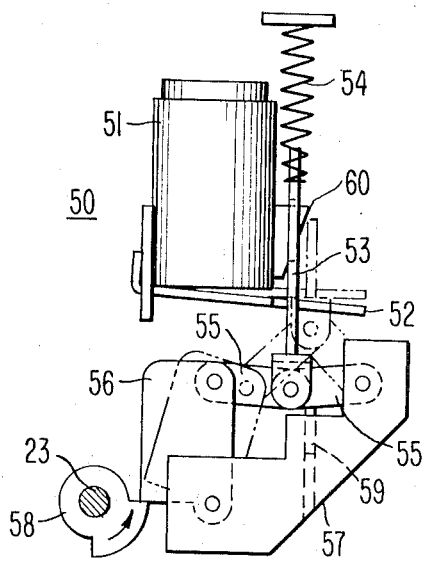
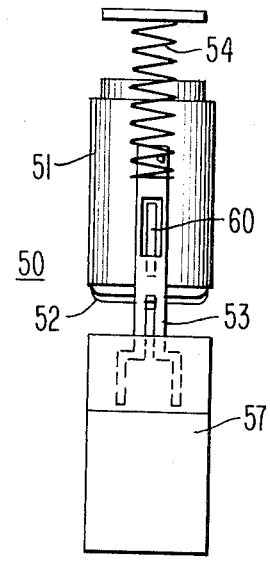
*Fig.4*   *Fig.5*
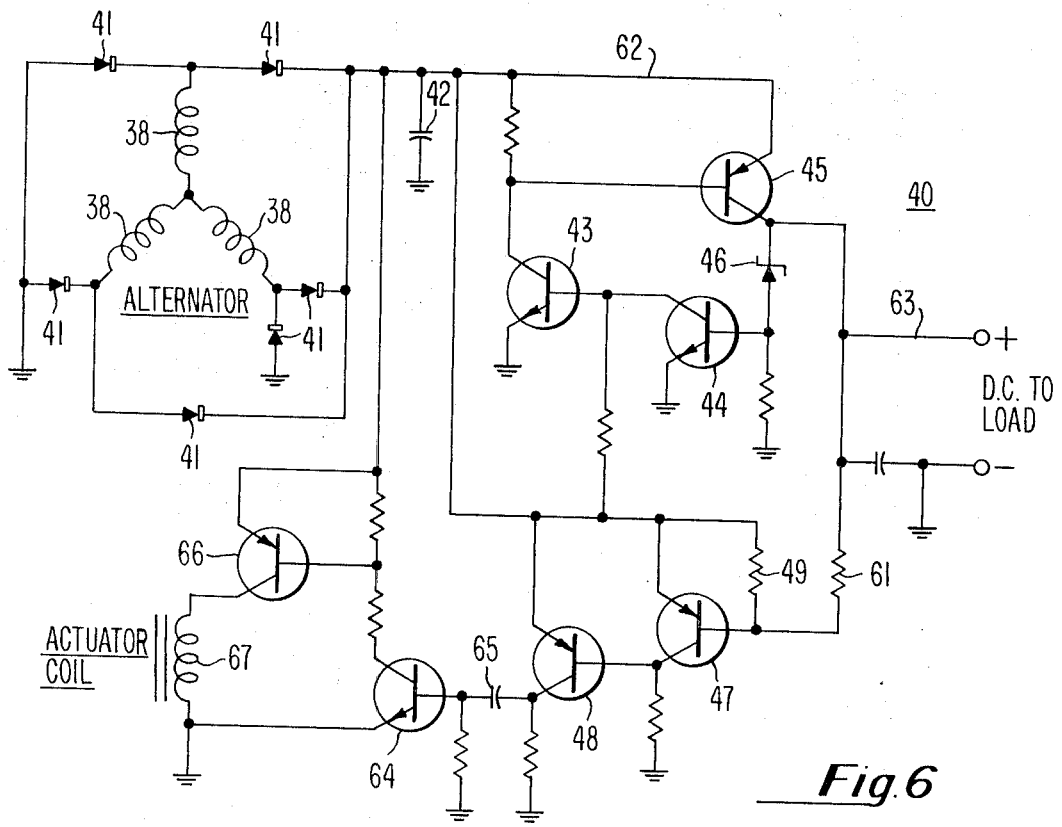
*Fig.6*

MECHANICAL-TO-ELECTRICAL CONVERSION SYSTEM

CROSS REFERENCE TO RELATED APPLICATION

The present invention is related to application Ser. No. 201,638 entitled "System for the Generation of Electrical Power Having a Spring-Powered Prime Mover Responsive to Output Voltage," by Clifford J. Bader and Richard P. Branco, now U. S. Pat. No. 3,675,113. This reference application and the present one are assigned to a common assignne.

BACGROUND OF THE INVENTION

The invention herein described was made in the course of or under a contract with the U. S. Army.

As noted in the reference application, situations exist where the decline of available power in electric batteries during extended shelf life or in service where only intermittent power is required over a long period of time, cannot be tolerated. The present invention, like that taught in the reference application, provides a source of electrical power whose output level is substantially unaffected by the passage of time, but rather is a function of the mechanical energy present in the system. The rate at which this mechanical energy is expended is in turn a function of the electrical load requirements. Such power sources are especially suited for applications requiring extreme ruggedness and long-term untended operation. Recent advances in the development of low-power drain integrated and discrete electronic components have further broadened the scope of such applications. Thus, it is possible to design electronic circuits with operational amplifiers having current drains of one or two microamperes, and with complimentary MOS logic having virtually zero drain except during level transitions.

Both the present invention and that of the reference application utilize a nonvolatile finite source of mechanical energy to power an electrical generator in an intermittent operating mode. In the reference system, a pair of voltage sensing means which respond to predetermined upper and lower output voltage limits are utilized. The starting and stopping of the generator is accomplished by way of a polarized double latching solenoid which is toggled from one state to its opposite state by an impulse from the appropriate voltage limit sensor. Thus, the generator is started on low limit demand and runs as long as necessary to achieve the upper voltage limit. The running time (and generator rotation angle) vary according to the available torque. The actuation of the sensors takes place in accordance with the electrical demand of the output utilization device.

The present system provides a more simplified approach to the batteryless power source in that a nonpolarized latching mechanism replaces the more complicated bistable magnetic latching means of the reference system. Moreover, the use of two voltage limit sensors in the reference system entails circuits which are difficult to design because of the required low standby current drain. The present system uses only a single low voltage limit sensor with corresponding savings in power to initiate the generator action. The stopping of the generator powered rotation is accomplished mechanically, after it has rotated through a fixed angle. Notwithstanding the design simplifications afforded by the present system taught herein, there is no significant sacrifice in performance when compared with the reference system.

SUMMARY OF THE INVENTION

The electrical generating system of the present invention is best described in connection with the operative embodiment presented hereinafter. However, it should be understood that the scope of the invention is not to be considered limited to such embodiment. For example, the generator itself may take many forms well known to electrical designers, which in accordance with particular applications may be equivalent, or even preferred, to the basic generator configuration chosen herein for purposes of description. Similarly, the finite source of energy used to power the generator may be of different types.

In accordance with the invention, a generating system is provided which incorporates a generator or alternator having a permanent rotor of salient four-pole design, driven through a gear train by a coiled spring. The generator has a fixed stator with three-phase "Y" connected coils or windings wound thereon. No commutator is present, and conversion to D.C. is accomplished by means of solid state rectification. Electrical energy is stored in a capacitor for delivery to the load.

A voltage sensing circuit is provided which responds to a preselected lower output voltage limit. In operation, the starting of the generator is accomplished by way of a non-polar latching mechanism comprising a solenoid actuator and appropriate linkages, which releases the gear train in response to an electrical impulse from the sensing circuit. The generator is then permitted to run through a fixed rotational angle before being stopped. The relatching of the mechanism and the halting of the generator powered rotation is accomplished mechanically by means of the rotation of a stepped cam. Actuation of the sensing circuit takes place in accordance with the load demand, and the metering out of the mechanical energy of the coiled spring to raise the output voltage to a suitable level is a function of the sensing circuit and the cam-controlled latching mechanism.

The system configuration and operational details given above have been presented in simplified form. Other features of the invention will become more fully apparent in the detailed description presented hereinafter.

BRIEF DESCRIPTION OF THE DRAWING

FIG. 4 is a front view illustrating the mechanical details of the latch mechanism;

FIG. 5 is a side view of the latch mechanism to better illustrate the release link;

FIG. 6 is a schematic diagram of the electrical details of the generating system, including the low voltage limit sensing circuit;

DESCRIPTION OF THE PREFERRED EMBODIMENT

Figure 1:
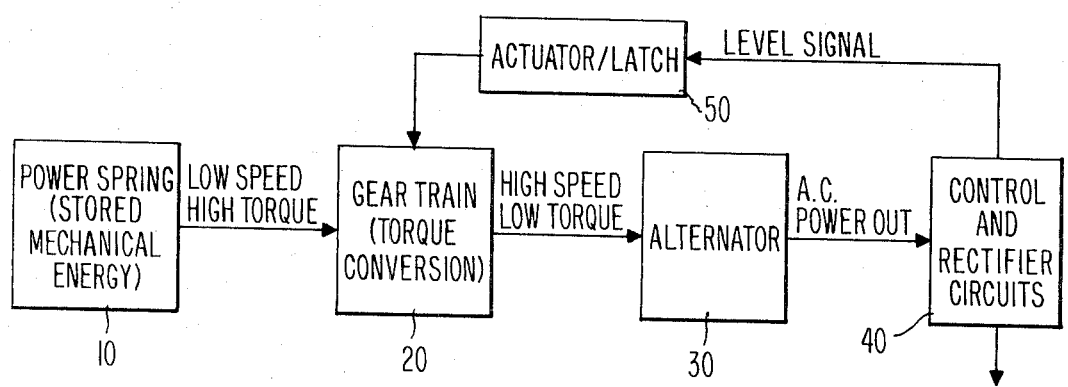
FIG. 1 is a block diagram of the principal sections of the generating system of the present invention.

FIG. 1 illustrates the basic configuration of the present system. The mechanical energy to drive the alternator rotor is supplied by a flat coiled power spring 10. This stored mechanical energy is transformed from the high torque-short deflection spring source to a low torque-longer deflection output by means of a gear train 20. From the energy input on the high speed rotor shaft of the alternator 30, a three-phase A.C. voltage is supplied to the control and rectifier circuits 40. The rectifier circuit converts to the alternator A.C. output to D.C. and the energy is stored in a capacitor for delivery to the load. The control circuit monitors the voltage level in the storage capacitor such that when it falls below a predetermined value in a "level signal" is applied to the actuator/latch mechanism 50. When triggered by the level signal, the mechanism releases the gear train to permit the generator to run for a short period of time. Subsequently, through the rotating action of a cam and suitable linkages, the actuator/latch mechanism locks the gear train to halt the generator action. A description of the components identified with the blocks of FIG. 1, and used in an actual operative embodiment of the invention, follows.

Figure 2:
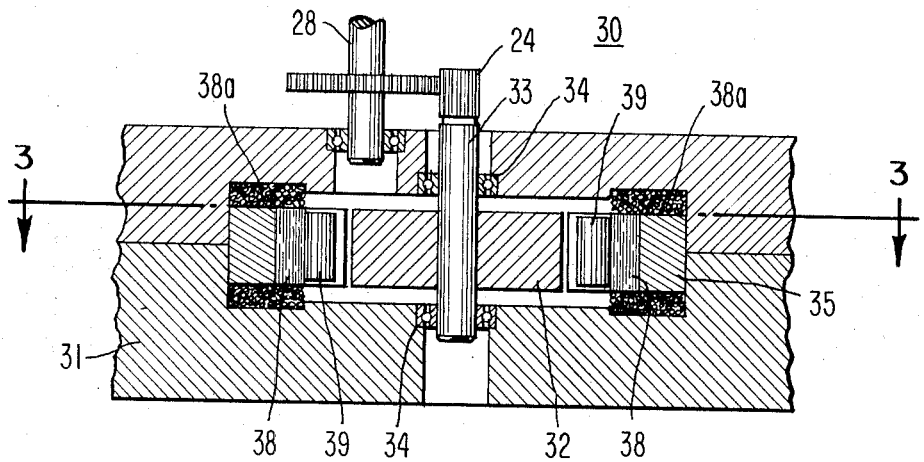
FIG. 2 illustrates a cross-section of an assembled basic generator which may be used in the system of FIG. 1.
Figure 3:
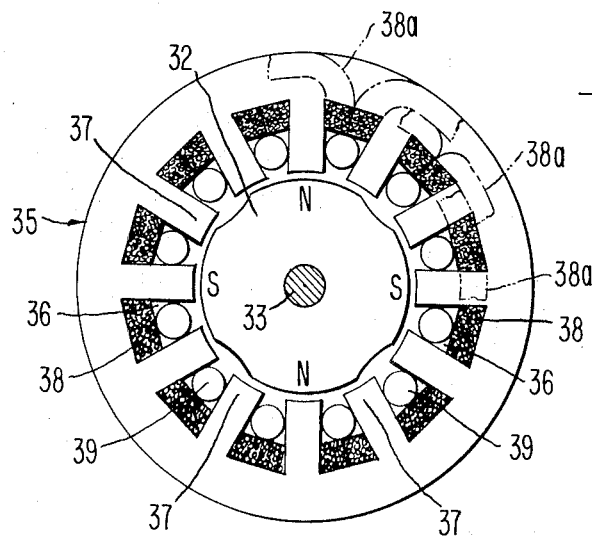
FIG. 3 is a section view taken along lines 3—3 of FIG. 2 to better illustrate the rotor and stator configuration of the generator.

FIG. 2 illustrates the cross section of the alternator 30 assembled within a housing 31; and FIG. 3, a section taken along lines 3—3 of FIG. 2. The rotor 32 mounted on one extremity of a non-magnetic shaft 33 supported by bearings 34 is of a standard cast permanent magnetic type of salient four-pole design. The actual rotor thickness was approximately 0.25 inches, and its outside diameter 0.73 inches. These dimensions were found to be compatible with the overall volume requirements of the operative embodiment and with the electrical requirements, assuming 2,500 gauss as the flux density.

The stator 35 was chosen to have 12 slots 36 and 12 pole shoes 37 to be consistent with four-pole, three-phase operation. The total area of the pole shoes was made equal to the total rotor pole area, which was about 60 percent of the circumferential area. The slots 36 are 0.77 inches wide on the inner circumference of the stator (0.74 inches diameter) and the pole shoes 37 are 0.116 inches wide. The stator 35 is formed from laminations of 0.14 inch thick rotor grade steel, which are stacked together to approximate the rotor thickness. With the foregoing dimensions, and based upon a three-phase "Y" connected four-pole machine, it was determined that 0.194 millivolts/turn/pole/radians per second would be required. Further, utilizing a generator speed of 1,600 rpm, and charging the storage capacitor from a starting voltage of 4 volts, to about 6 volts, and allowing 1.5 volts additional for rectifier and resistance drops, the number of winding turns per phase per pole was found to be approximately 310 turns. Since the windings are placed in the slots 36 in a "whole-coiled" winding arrangement, each slot has approximately 620 turns of wire, 38.

Each hase of the three-phase generator requires the use of four windings or coils. It was desired to place the maximum number of turns of wire in each slot with as little wire resistance as possible. As a compromise, 620 turns of AWG No. 40 wire were placed in each slot and held in position by dowel-like wedges 39. Most of the wire resistance occurs in the end turns 38a - those portions of the wires 38 lying perpendicular to the slots 36, and thus contributing nothing to the voltage output. The overall physical dimensions of the wound stator in an actual operative embodiment were 1.56 inches in diameter by 0.574 inches high.

FIG. 4 illustrates the actuator/latch assembly 50. The assembly comprises a solenoid actuator 51 adapted to be pulsed by the lower voltage limit sensor (to be described in detail in connection with FIG. 6) in order to move actuator door 52 toward the solenoid core. The actuator door 52 is operatively connected to a slotted actuator link 53 as seen more clearly in the end view of FIG. 5. One extremity of the actuator link 53 is coupled to a return spring 54. The latch assembly also includes toggle linkages 55 and a pivoting block 56 all supported by a toggle housing 57, and mounted in proximity to a preselected shaft 23 of the gear train — the latter shaft having mounted thereon a stepped cam 58.

Figure 7:
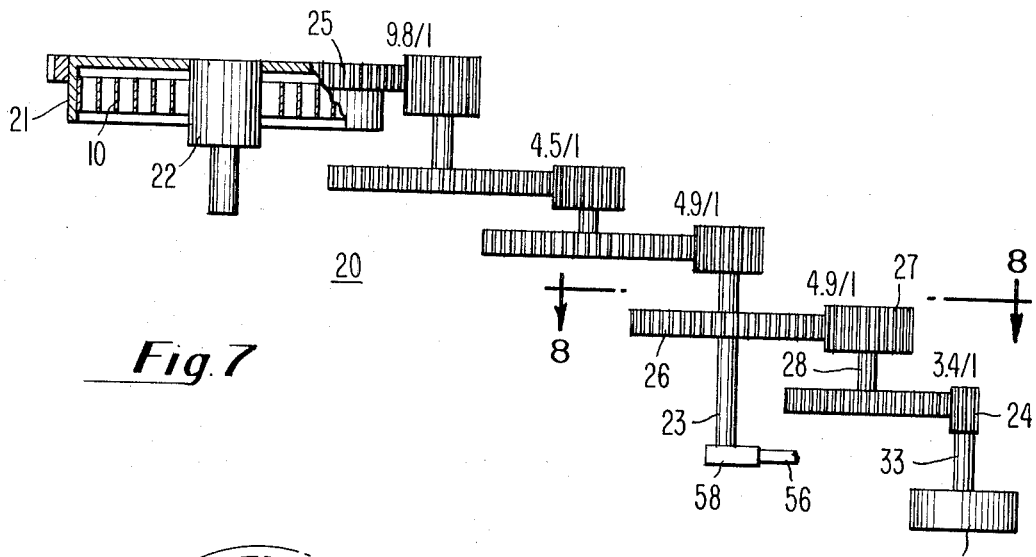
FIG. 7 illustrates a representative gear train for use in the system of FIG. 1.

In operation in the present system, cam 58 is mounted on shaft 23 (as seen in FIG. 7). One revolution of this shaft allows for approximately 16 revolutions of the generator rotor 32. This is also equivalent to .004 revolutions of the spring drum 21. The radius of the cam 58 is about 0.2 inches. In the absence of a level signal or pulse from the sensing circuit, the gear train is locked through the action of pivoting block 56 in the cam 58, and the two links 55 of a toggle which are over-center. An adjustment for the latter condition is provided by offset adjustment means 59. The purpose of having the toggle over-center is to prevent the gear train from overriding the stop when the rotor inertia is added to the torque. Upon a signal from the sensing circuit (FIG. 6) that the voltage in the energy storage capacitor 42 has fallen to a preset lower limit, the solenoid 51 is actuated, and the door 52 is pulled a distance of approximately 0.015 inches. This is sufficeint to move the actuator link 53 and the pivot of the toggle links 55 through center to the other side, so that the torque exerted on shaft 23 by the gear train and the mechanical energy source, can collapse the linkage. The release line 53 is slotted in two areas — the one adjacent to the pivot area allowing the collapsing link to clear the actuator door, while the other area serves as a guide for the projection 60 mounted adjacent the actuator solenoid 51.

The return spring 54 is selected to be of a conical compression type, which has a variable spring rate. Thus, the spring restoring force is designed to be very light for the first 0.015 inches of travel to permit the solenoid to move the actuator link 53, but also to have a larger spring rate for the remainder of the travel to accelerate the toggle links 55 to the locked position after the cam 58 clears the pivoting block 56.

The electrical details of the present system are best described in connection with the schematic diagram 40 of FIG. 4. Four distinct functional circuit areas are evident, namely, the rectifier system, the voltage regulator, the lower voltage limit sensor and the latch actuator driver.

Considering first the rectifier system, the three-phase A.C. voltage generated by the alternator in the "Y" connected windings 38, is rectified by conventional three-phase, full-wave bridge connected high conductance silicon diodes 41. Since two diode junctions are involved in the active rectification path, two voltage drops totalling about one volt are present. The diode outputs appear across energy storage capacitor 42, which is of the order of 1,000 MFD.

The voltage regulation in the system is provided by transistors 43, 44 and 45, and a Zener device 46. Any commercially available regulator device which offers source resistances on the order of 1,000 ohms at 1 microampere may be utilized for the last-mentioned device. In the present operative system, the device regulates at about 4.4 volts, although similar devices are available for higher or lower voltages, depending upon the application. It is generally necessary to maintain a constant current flow through Zener device 46 for supply voltages ranging from the peak value at the end of a charging cycle to the lower voltage limit, which should be as close as possible to the reference level. This condition provides a constant reference voltage for the lower voltage limit sensor to be described shortly. Transistors 43, 44 and 45 are arranged in a regenerative (boot strap) configuration to provide the aforementioned constant current condition. Thus, the regulated voltage is used to establish the constant current, which in turn stabilizes the regulated voltage. The output voltage supplied to the load appears on the collector of transistor 45 and is equal to the voltage across Zener device 46 plus the base-emitter voltage drop of transistor 44, and is therefore about 5 volts. The output voltage as seen by the load is constant, and this condition is of considerable value in applications involving voltage sensitive load circuits.

The lower voltage limit sensing circuit comprises transistors 47 and 48. Transistor 47 and a pair of like-value resistors 49 and 61 form a comparator circuit which is connected between the storage capacitor bus 62 and the output bus 63. When the voltage on the capacitor bus 62 falls to within two junction drops, that is, about 1.2 volts, of the voltage on the output bus 63, transistor 47 ceases conduction and transistor 48 which was formerly held in a nonconducting state by the voltage appearing on the collector of transistor 47 and applied to its base, is now driven to conduction. A positive level at the collector of transistor 48 indicates that the lower voltage limit has been reached.

The initiation of conduction in transistor 48 causes a positive-going "level signal" pulse to be applied to the base of transistor 64 in the latch actuator circuit by way of capacitor 65. Actually, in order to minimize the electrical energy consumed by the latch actuator, current is supplied only for the time necessary to insure unlatching. Capacitor 65 performs the time quantizing function. Transistor 64 is held in a conducting state for about 20 milliseconds, after which time, capacitor 65 becomes charged to the supply potential and can no longer support transistor 64 base current. Transistor 64 during its active state, triggers driver transistor 66 to conduction which provides sufficient gain to drive the 320 ohm actuator coil 67, requiring about 16 milliamperes current drain. The last-mentioned current existing for 20 milliseconds causes the level in the storage capacitor 42 to decrease by 0.32 volts, so that the actual capacitor bus voltage at the start of the charging cycle is slightly under 5 volts. Since the regulator circuit described hereinbefore is designed to maintain constant output voltage until the capacitor bus drops to about 4.5 volts, an adequate margin for regulation exists.

In operation, it is assumed that the coiled spring 10 has been prewound and that a preceding cycle of generator operation has charged the energy storage capacitor 42 to a prescribed level. Ignoring leakage currents, if no electrical power is drawn by the load, the system will remain in a quiescent condition, and no mechanical energy will be expended in running the alternator. On the other hand, if power is consumed by the load such that the voltage on the capacitor bus 62 drops to a predetermined lower limit, transistor 48 in the lower voltage limit sensing circuit will send a "level signal" to transistor 64 in the latch actuator circuit. This in turn will cause driver transistor 66 actuate the link 53 (FIGS. 4 and 5). As explained hereinbefore, movement of link 53 operates through the action of toggle linkages 55 to release shaft 23 with its stepped cam 58, thereby permitting the alternator 30 to make approximately 16 revolutions. During these revolutions, the rotor 32 accelerates to about 1,600 rpm, which generates approximately 17 volts RMS, less resistance drops. The running time for the alternator is approximately 1 second. For a constant load drain of 10 microamperes, the charging cycle will be repeated about every 3 to 5 minutes. Under this condition, the spring energy provided in the operative system for a single winding thereof, is usable over a 48-hour period.

FIG. 7 illustrates a power conversion system comprising a power spring 10 with drum 21 and arbor 22, and a torque reducing gear train 20 which comprises 6 shafts and 5 gear passes. The approximate gear ratio is 3,600 to one, from the rotor 32 to the drum 21. Shaft 23 has been arbitrarily chosen as a convenient position to lock the gear train, and cam 58 is mounted on this shaft. The alternator rotor 32 is fastened to one end of shaft 33, the other end of which consists of a gear 24. A ring gear 25 is shown attached to drum 21. The approximate gear ratios between contiguous gears are indicated in FIG. 5.

Figure 8:
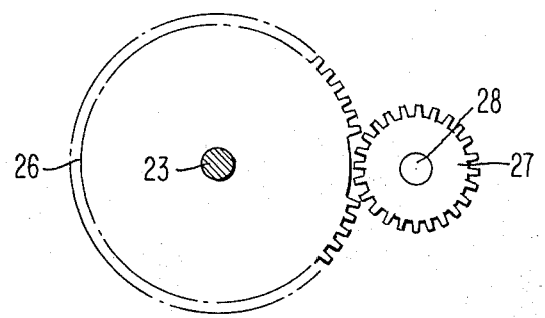
FIG. 8 is a section view taken along lines 8—8 of FIG. 7 showing the configuration of two intermediate gears to permit the free running of the rotor when the latching cam halts the generating cycle.

FIG. 8 which is a section view taken along lines 8—8 of FIG. 7 illustrates the positioning of gear 26 to gear 27 in an arrangement which permits shaft 28 as well as shaft 33 (and rotor 32) to free-wheel at the termination of each charging cycle. It will be recognized that most of the system inertia is concentrated in the rotor 32 and that a sudden stop of the rotor from about 1,600 rpm (as the cam 58 on shaft 23 contacts the pivot block 56) could damage gear teeth or over-stress shafts. While it is possible to design a full contact system where such abrupt stops would not be injurious, it was decided to modify the gear 26 by removing several teeth therefrom, so that in the stopped position (which will be identical for each cycle of generator operation), the succeeding shafts 28 and 33 would be disconnected from the remainder of the train. Rotor inertia and magnetic reluctance effects, although present, nevertheless do not seriously affect start-up of the generator in the next charging cycle.

Figure 9:
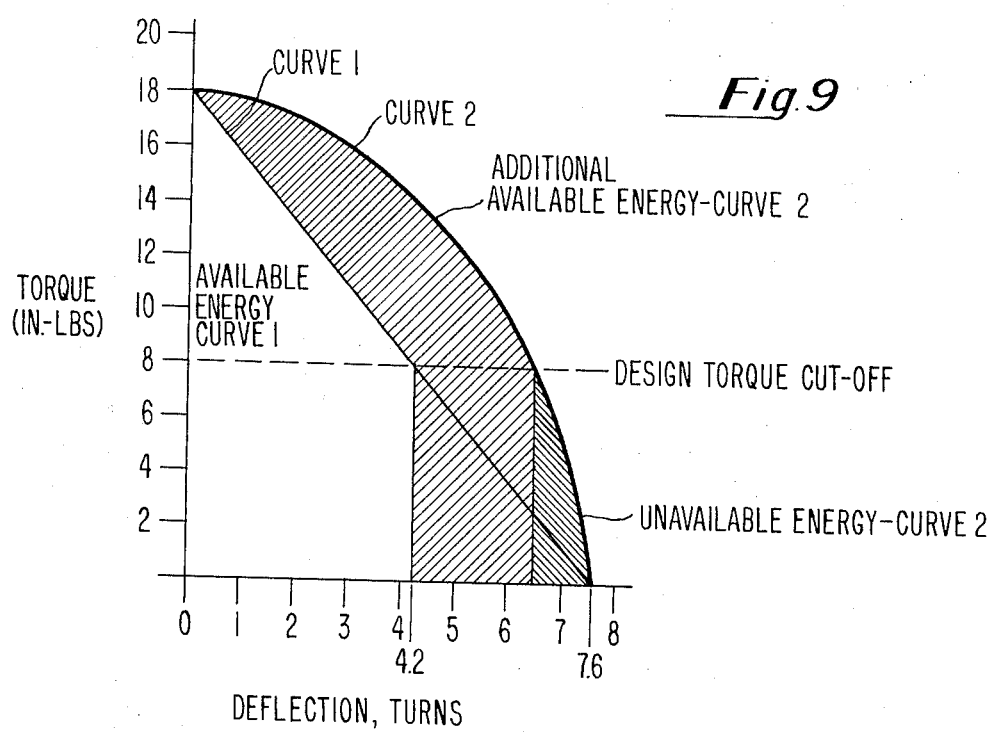
FIG. 9 illustrates representative load/deflection curves for a flat coiled spring which may serve as the mechanical energy source.

The mechanical energy for the system is provided by a flat coil spring 10, commonly referred to as a clock or motor type spring. FIG. 9 illustrates both a straight-line "worst-case" curve (curve 1) and an optimum torque/deflection curve (curve 2) for the type spring useful in the present system. The worst-case curve is utilized to establish minimum design parameters. The effective length of a flat coil spring changes as the spring unwinds, therefore it may be expected that the torque versus deflection curve is not strictly linear. In the operative system, a lower limit of 8 in.-lbs. and an upper limit of 18 in.-lbs. were selected as suitable limits. The 8 in.-lbs. lower-limit was dictated by the static starting torque associated with the gear train, alternator and latch mechanism. The upper limit of 18 in.-lbs. is the maximum spring torque, and this parameter is partly responsible for setting the spring dimensions.

If an integral is taken between the two limits of 8 to 18 in.-lbs., the result will be the amount of "available" or usable energy which can be extracted from the spring.

Considering curve 1, the "worst-case" curve for $n = 7.6$ turns and $Tm$ the maximum torque $= 18$, the "total" energy $E_t$, stored in the spring is computed as $$E_t = \tfrac{1}{2} \times Tm \times 2\pi \times n$$

or $$= \tfrac{1}{2} \times 18 \times 6.28 \times 7.6 \cong 430 \text{ in.-lbs.}$$

This is represented in FIG. 9 as the large triangular area under curve 1, having a heighth of 18 and a base of 7.6.

Again, under "worst-case" conditions, the energy "unavailable", $E_u$, because of system friction torque and based on $n = (7.6-4.2) = 3.4$, since design torque cut off occurs after 4.2 turns of the spring have been realized, is $$E_u = \tfrac{1}{2} \times 8 \times 6.28 \times 3.4 \cong 85 \text{ in.-lbs.}$$

In FIG. 9 this "unavailable energy" is contained in the smaller triangular area under curve 1, having a heighth of 8 and a base of 3.4 (from 4.8 to 7.6 on the horizontal axis).

The "worst-case" (minimum) "available" energy is the difference of $E_t$ and $E_u$ or approximately 345 in.-lbs. This "available energy" is shown as the non-crosshatched area under curve 1.

It had been determined that for operation over a 48-hour period, a total of 296 in.-lbs. plus 37 in.-lbs. of friction energy loss would be required of the system. It is apparent from the foregoing "worst-case" calculations that sufficient energy would be available even from a spring having this characteristic. Of course, any spring curve lying above the straight line of curve 1 and approaching the "optimum" curve 2 would provide "additional available energy" and have less "unavailable energy" as shown in FIG. 9 for curve 2. The design parameters for a spring suitable for the application chosen for purpose of example are as follows:

Spring Drum (I.D.) — 2.750 inches
Arbor Diameter — 0.532 inches
Spring Height — 0.375 inches
Torque at Solid — 18 in.-lbs.
Torque at 4.2 turns down — 8 in.-lbs.

As is well known, spring design involves the use of empirical equations, charts and graphs because of the nonlinearities involved. Therefore depending upon the particular application, parameters such as gear train ratio, spring thickness and spring width may be selected by the designer to approach optimum operating conditions.

From the foregoing teaching, it should be apparent that the present invention provides a relatively simple yet reliable and efficient nonvolatile source of electrical energy, suitable as a replacement for electrical batteries in selected applications. While the operative embodiment of the invention chosen for purpose of description is satisfactory for its intended use, it should be understood that changes and modifications of the described arrangements may be needed to fit particular operating requirements. These changes and modifications, insofar as they are not departures from the true scope of the present invention, are intended to be covered by the following claims.

What is claimed is:

1. An electrical generating system comprising in combination a source of mechanical energy, generator means including a stator and rotor, said generator means being operatively connected to said source for converting said mechanical energy to electrical energy, storage means coupled to said generator means for storing said electrical energy, voltage regulating means interposed between said storage means and an output terminal of said system, sensing circuit means coupled to said storage means and to said system output terminal for sensing a predetermined lower voltage limit of the energy in said storage means and for providing a signal indicative of said limit, actuator/latch means coupled to said sensing circuit means and operatively connected to said source of mechanical energy, said actuator/latch means being responsive to said signal from said sensing circuit means for releasing said mechanical energy to effect rotation of said generator rotor thereby initiating a conversion cycle, said actuator/latch means being adapted to terminate the release of said mechanical energy after said generator rotor has rotated through a predetermined fixed angle.

2. An electrical generating system as defined in claim 1 wherein said generator means is operatively connected to said source of mechanical energy through a torque reducing gear train.

3. An electrical generating system as defined in claim 2 wherein said actuator/latch means includes a solenoid assembly having an actuator door adapted to be moved in response to the energization of the solenoid, a release link operatively connected to said actuator door and adapted to move therewith, a pair of toggle linkages each having an extremity thereof coupled to one end of said release link, a return spring coupled to the other end of said release link, a block-like member coupled to the opposite extremity of one of said toggle linkages and pivotally mounted to engage a stepped cam affixed to a selected shaft in said gear train, said block-like member effectively locking said gear train to prevent rotation of said generator rotor in the absence of a signal from said sensing circuit means, means for energizing the actuator coil of said solenoid in response to a signal from said sensing circuit thereby causing said actuator door and said release link to move in a direction to initiate the collapse of said toggle linkages from their original outstretched over-center position, the initial movement of said toggle linkages in combination with the torque applied to said stepped cam by said source of mechanical energy effecting movement of said toggle linkages through said center position and the pivoting of said block-like member in a direction to release said selected shaft and to permit the rotation of said generator rotor, thereby initiating a generating cycle, said stepped cam rotating with said selected shaft, said return spring being effective after said cam has cleared said block-like member to return said actuator link and said toggle linkages to their original positions, the latter linkages pivoting said block-like member in a direction to engage said cam and again lock said gear train after said selected shaft has completed one revolution, the locking of said gear train terminating said generating cycle, said generator rotor having been driven through a predetermined fixed angle during said generating cycle, thereby raising the level of the energy stored in said storage means above said lower limit.

4. An electrical generating system as defined in claim 3 wherein said storage means is a capacitor having first and second terminals connected respectively to a capacitor bus and to a reference potential.

5. An electrical generating system as defined in claim 4 wherein said sensing circuit means comprises first and second transistors each having input, output and control electrodes, the input electrodes of said first and second transistors being connected respectively to said capacitor bus and the output electrodes of said first and second transistors being coupled respectively to said reference potential, a resistance divider network connected between said capacitor bus and said system output terminal, the control electrode of said first transistor being coupled to the center tap of said resistance divider, the output electrode of said first transistor being connected to the control electrode of said second transistor.

6. An electrical generating system as defined in claim 5 wherein said voltage regulating means comprises third, fourth and fifth transistors each having input, output and control electrodes, the input electrode of said third transistor being connected to said capacitor bus, a Zener device and a resistor connected in series and coupling the output electrode of said third transistor to said reference potential, the output electrode of said third transistor being connected to said system output terminal, the control electrode of said fourth transistor being connected to the junction of said Zener device and said resistor, means coupling the output electrodes of said fourth and fifth transistors respectively to said capacitor bus, the input electrodes of said fourth and fifth transistors being connected to said reference potential, the output electrodes of said fourth and fifth transistors being connected respectively to the control electrodes of said fifth and third transistors.

7. An electrical generating system as defined in claim 6 wherein said means for energizing the actuator coil of said solenoid includes a sixth and a seventh transistor each having input, output and control electrodes, a resistance-capacitance network coupling the output electrode of said second sensing circuit transistor to the control electrodes of said sixth transistor, the input electrode of said sixth transistor being connected to said reference potential, a pair of resistance means connected in series and coupling the output electrode of said sixth transistor to said capacitor bus, the control electrode of said seventh transistor being connected to the junction of said pair of resistance means, the input electrode of said seventh transistor being connected to said capacitor bus, said solenoid actuator coil having a pair of terminals connected respectively to the output electrode of said seventh transistor and to said reference potential.

8. An electrical generating system as defined in claim 7 wherein said generator means is an alternator, said rotor being comprised of a salient four-pole permanent magnet and said stator having three phase "Y" connected windings disposed thereon.

9. An electrical generating system as defined in claim 8 further including rectifier means interposed between said stator windings and said storage capacitor terminals, said rectifier means comprising six diodes arranged in a three-phase full-wave bridge configuration.

10. An electrical generating system as defined in claim 9 wherein said source of mechanical energy is a flat coiled power spring.

11. An electrical generating system as defined in claim 10 wherein a gear affixed to said selected shaft carrying said stepped cam and adapted to drive a meshing gear on the rotor side of said gear train has a selected plurality of teeth removed therefrom such that upon the abrupt locking of said gear train by said block-like member, said meshing gear and the portion of the train which includes said rotor will be disengaged from the remainder of the train and permitted to coast to a stop.

* * * * *